United States Patent [19]

Brotzmann et al.

[11] 4,171,971

[45] Oct. 23, 1979

[54] METHOD OF MANUFACTURING HOT METAL

[75] Inventors: Karl Brotzmann; Hans-Georg Fassbinder, both of Sulzbach-Rosenberg, Fed. Rep. of Germany

[73] Assignee: Eisenwerk-Gesellschaft Maximilianshutte mbH, Sulzbach-Rosenberg, Fed. Rep. of Germany

[21] Appl. No.: 884,510

[22] Filed: Mar. 8, 1978

[30] Foreign Application Priority Data

Mar. 8, 1977 [DE] Fed. Rep. of Germany ....... 2710106

[51] Int. Cl.² .............................................. C21B 13/02
[52] U.S. Cl. .......................................... 75/34; 75/36; 75/38
[58] Field of Search .......................... 75/34, 36, 38, 26

[56] References Cited

U.S. PATENT DOCUMENTS 2,894,831  7/1959  Old ............................................ 75/26
3,615,351  10/1971  Happel ..................................... 75/34

*Primary Examiner*—P. D. Rosenberg
*Attorney, Agent, or Firm*—Lawrence I. Field

[57] ABSTRACT

A method of manufacturing hot metal from iron oxide in a shaft furnace by means of reduction with CO and $H_2$ is described in the case of which iron oxide and coke are placed in the shaft furnace. For the purpose of the coke combustion, oxygen or a gas containing oxygen is introduced together with a reduction gas having a temperature ranging from approximately 1300° to 1500° C., comprising for the most part CO and $H_2$ and introduced from the hot metal zone of fusion into the furnace shaft. The flue gas of the shaft furnace is purified at least partly, whereby a backflow gas comprising for the most part CO and $H_2$ is formed and introduced back into the shaft furnace. This method is characterized by the fact that it is especially economical.

14 Claims, 2 Drawing Figures

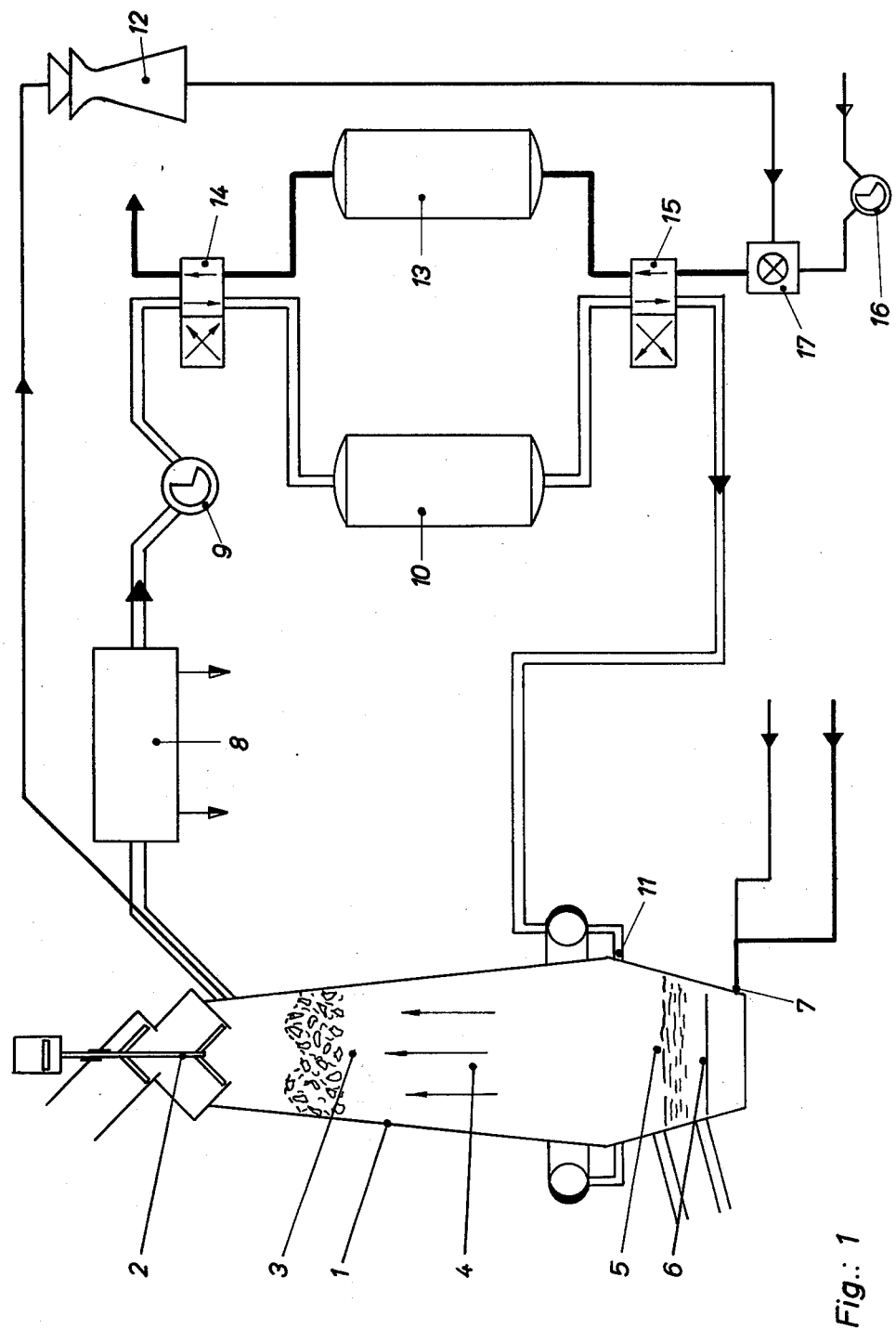
Fig.: 1

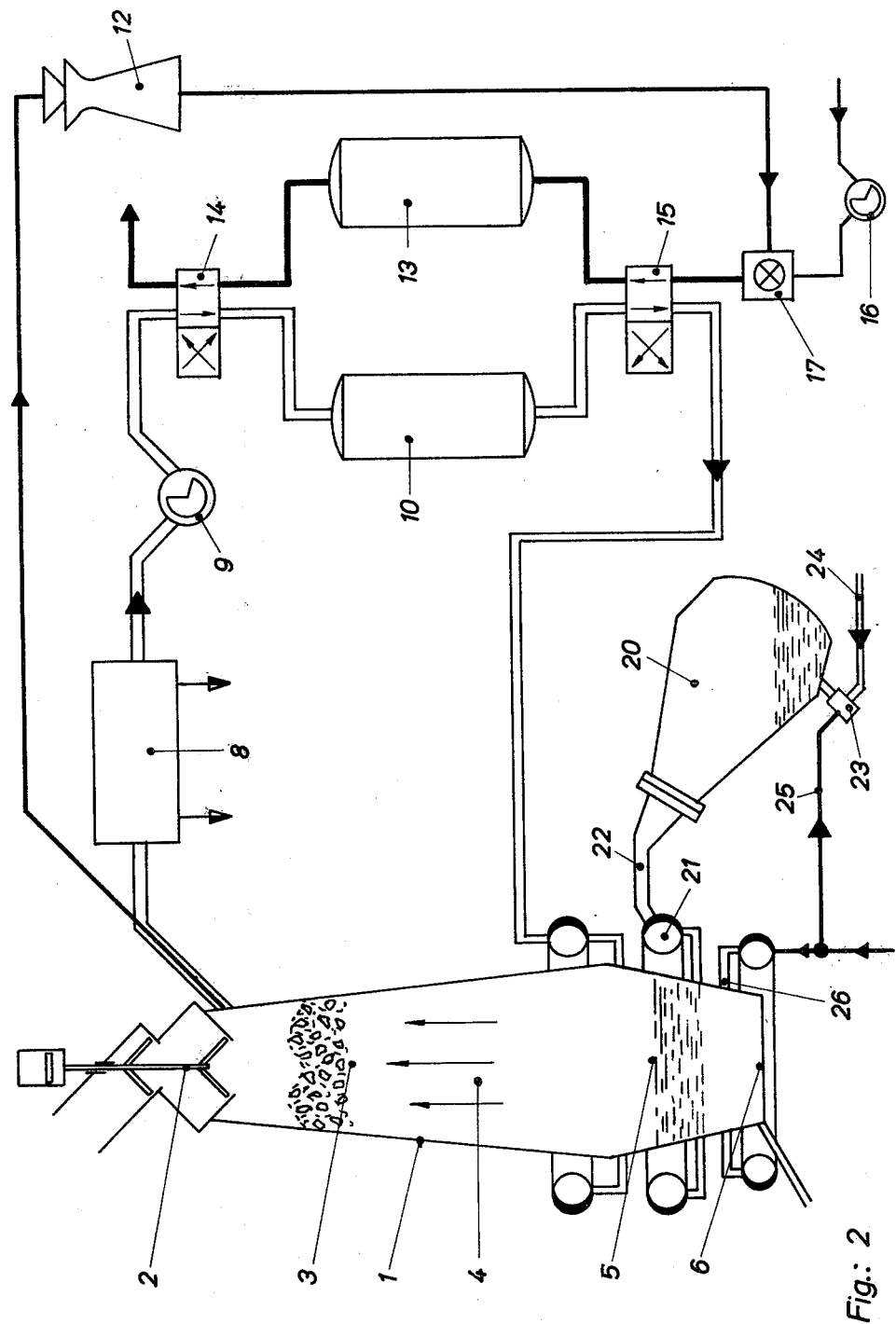
Fig.: 2

METHOD OF MANUFACTURING HOT METAL

The invention relates to a method of manufacturing molten pig iron.

Today the manufacture of pig iron in the blast furnace is the usual and most economical method and it is the world-wide basis for the mass production of steel.

The coke necessary for the blast furnace process is by far the largest cost factor in the production of hot metal. Thus no small number of attempts have been made aimed at lowering the use of coke in the blast furnace.

A series of known methods are aimed at substituting coke by cheaper energy. For example a method is known according to which hydrocarbons are introduced into the furnace together with the hot blast. Fuel oil, natural gas and also coal dust have been utilized in this way. These methods have shown that up to 120 kg of coke/t of iron can be saved and replaced by the cheaper hydrocarbons.

A method is described in the published patent application DE-OS No. 25 20 938 according to which the reduction gas for metallurgical applications is produced in a molten iron bath. The temperature of the reduction gas is reduced to approximately 1000° C. for example by the addition of inert gas and it is then introduced into the reduction zone of the blast furnace.

According to another method of producing the reduction gas CO and $H_2$ are produced from natural gas and this gas is purified after cooling. It is subsequently heated to approximately 900° C. and fed into the reduction process, for example into the blast furnace.

It is of decisive importance in the production of reduction gas to keep the amounts of $CO_2$ and $H_2O$ very low. A 10% content of $CO_2$ and $H_2O$ in relation to CO and $H_2$ is enough to lower the reducing power by a third. It was mostly the demand for high purity of the reduction gases which prevented them from being used on a wide basis in the blast furnace process up to now.

In the published patent application DE-OS No. 24 24 932 a method of manufacturing hot metal is described in the case of which no use at all is made of blast furnace coke. According to this method the reduction of the ores and the subsequent smelting down process is carried out in various vessels. The separation of reduction and smelting down is necessary since the coke takes over a support function in the shaft furnace upon softening of the reduced ores. For this reason the ore must be reduced below its fusion temperature and the smelting down process, e.g. by putting the reduced ores into liquid metal, must be subsequently carried out in a second vessel in the case of the process not making use of coke. The heat necessary for the smelting down process is generated by the combustion of carbon along with oxygen within the melt. In this case the carbon is only oxidised to CO with the result that as flue gas a reduction gas is given off which after intermediate cooling is used in the reduction shaft.

The present invention is aimed at creating a method which allows the maintenance of the advantages of the known blast furnace process for the manufacture of hot metal with a considerably low amount of coke as well as the extensive use of reduction gases comprising economical substances containing carbon and/or hydrocarbon and whereby the reduction and smelting down process can be carried out in one furnace apparatus.

The invention is based on finding a method of manufacturing hot metal from iron oxide in a shaft furnace by reduction with CO and $H_2$ wherein iron oxide and coke are placed in the shaft furnace, oxygen or a gas containing oxygen is introduced for the combustion of the coke, a reduction gas comprising for the most part CO and $H_2$ and having a temperature ranging from approximately 1300° to 1500° C. is introduced from the hot metal zone of fusion into the furnace shaft and the flue gas of the shaft furnace is purified at least partly, whereby a backflow gas comprising for the most part CO and $H_2$ is formed, and then it is introduced back into the shaft furnace.

The iron oxide used may in general be prepared in a known manner, either by sintering or by pelletization. Likewise, lump ore may be used provided the amount of moisture, hydrated water or carbonatically bonded carbon dioxide contained in it is small.

The amount of coke added to the burden should be such that its combustion to CO for the most part covers the melting heat required for the metal and the slag. Direct reduction according to the formula $C + FeO = CO + Fe$, which requires much heat, is avoided.

The introduction of oxygen or gas containing oxygen for the combustion of the coke in the shaft furnace may be carried out in the usual known manner.

The reduction gas comprising for the most part CO and $H_2$ is introduced from the hot metal zone of fusion of the shaft furnace into the furnace shaft. The temperature of the reduction gas ranges from approximately 1300° to 1500° C., especially 1350° to 145° C. and should amount preferably to about 1400° C. The heat content of the reduction gas is used for heating and smelting down the reduced iron ore in order to cool the gas down to a temperature amounting to approximately 900° C., this being the temperature preferred in the zone of reduction.

The reduction gas may for example be composed of approximately 70 to 80% CO and approximately 15 to 25% $H_2$. As previously mentioned, it is an advantage to use as pure a reduction gas as possible comprising for the most part CO and $H_2$ and containing the smallest possible amounts of $CO_2$ and $H_2O$. The amount of those impurities should if possible be below 1%.

It is preferable to arrange the method in such a manner that the reduction gas and the gas obtained from the combustion of the coke, which again for the most part comprises CO and $H_2$, meets approximately half the demand for reducing gas in the furnace shaft. The total demand is in the range of approximately 1500 m³ $CO + H_2$ per ton of hot iron.

The remainder of the demand for reducing gas is met by the fact that the flue gas of the shaft furnace is purified, whereby a recycle gas comprising for the most part CO and $H_2$ is formed, and then it is led back into the shaft furnace. The purification of the flue gas, amounting for the most part to the removal of $CO_2$, $H_2O$ and dust particles, is already known and may be carried out in the known manner. The purified gas is heated to a temperature ranging from approximately 800° to 1000° C., the preferred temperature amounting to approximately 900° C., and again introduced into the shaft furnace above the zone of fusion. Thus it can be achieved that an extended zone of reduction is produced in the reduction shaft whose temperature is almost constant, amounting preferably to approximately 900° C., and which insures complete utilization of the reduction gases.

According to a preferred embodiment of the method according to the invention the reduction gas is not produced in the shaft furnace but in a separate operation for example in a molten iron bath and the reduction gas thus manufactured is introduced directly and without cooling or intermediate purification into the zone of fusion of the shaft furnace. The manufacture of the reduction gas in a molten iron bath is known. In this regard, explicit reference is made to the manifestation in the published patent applications DE-OS Nos. 25 20 938; 25 20 883; 25 20 868; 25 20 584 and 26 04 140.

The reduction gas produced in the molten iron bath may be introduced directly into the shaft furnace, i.e. without purification or cooling. The gases enter the shaft furnace at a temperature ranging from between 1300° and 1500° C.

The reduction gas is preferably produced in the molten iron bath by introducing below the surface level of the bath and reacting at raised pressure therein oxygen and/or gas containing oxygen through at least one nozzle built into the refractory lining of the furnace containing the molten iron bath and protected against premature burning back by means of hydrocarbon-containing media and by introducing below the surface level of the bath and reacting at raised pressure therein carbon and/or carbon-containing substances through at least one nozzle built into the refractory lining of the furnace containing the molten iron bath.

Since very pure reduction gases can be produced in the molten iron bath, they can be introduced directly into the shaft furnace without the need for any apparatus between. Thus the danger of leaks, which might lead to impurity of the reduction gases, is very small indeed. The fact that the purification and cooling of the reduction gases produced in the iron bath is not necessary is of great importance. Furthermore, the method is of advantage as regards the power balance, since the total heat of the reduction gases from the molten iron bath can be exploited. Thus very high economic efficiency of this combination of shaft furnace and apparatus for the production of reduction gas is achieved.

According to a further preferred variation of the method according to the invention the reduction gas is produced in the shaft furnace in situ. In this case the hot iron melt in the shaft furnace is used for bringing about the reaction of the reaction components for the production of the reduction gas. The production of the reduction gas is carried out in principle along the same lines as in the molten iron bath. Advantageous varieties of the manufacture of the reduction gas in the molten iron bath as regards method and apparatus can, therefore, be applied in the same manner to the direct manufacture of the reduction gas in the shaft furnace.

Thus, for example, it is an advantage to arrange the nozzles for introducing the carbon and/or hydrocarbon-containing substances and the oxygen and/or oxygen-containing gases in the refractory lining and to introduce the reaction components below the surface of the bath. The oxygen is preferably introduced using a hydrocarbon encasement to protect the nozzles. Fuel oil and coal dust, for example, have proved efficient as carbon carriers.

The reduction gas manufactured in this manner is produced at temperatures ranging from between 1300° and 1500° C., preferably amounting to approximately 1400° C.

The amount of oxygen introduced can be selected in such a manner that it is sufficient for the gasification of the carbon and/or hydrocarbon-containing substances. It has, however, proved to be practical to add higher amounts of oxygen. Thus, for example, in order to simplify the set-up of the method the amount of oxygen required for the combustion of the coke may also be added through the nozzles for producing the reduction gas in the hot metal.

It has proved to be especially practical to control the ratio of coke to oxygen in such a manner that the amount of carbon, which is not combusted, is not sufficient to saturate the hot metal with carbon, but instead the carbon content of the hot metal becomes stable at approximately 3% for example. The formation of soot due to the gasification of the hydrocarbons can be avoided with certainty by means of this preferred measure.

Fuel oil or residual oils from the distillation of crude oil have proved to be most efficient from an economical point of view for the manufacture of the reduction gas both in the molten iron bath and in the hot metal bath of the shaft furnace itself. These fuel oil fractions are preheated to approximately 150° to 400° C., preferably to 300° C., so that they can be transported easily and can be introduced simply to the gasification process. Types of pulverised coal have also proved to be successful for the production of reduction gas. In the case of the use of pulverised coal it has proved to be practical to dry the coal in order to thus produce a reduction gas of greater heat content.

It is preferred to operate the shaft furnace at excess pressure, especially at an excess pressure between 0.5 and 8 bar, in particular 2 to 4 bar and preferably at approximately 3 bar. By applying higher pressures in the shaft furnace the performance and thus the production of hot metal can be increased noticeably. A pressure in the region of approximately 3 bar has proved to be practical, as this pressure keeps the apparatus requirements at a minimum and as on the other hand the production is approximately doubled as against the production at a pressure in the region of approximately 0.5 bar.

Part of the flue gas drawn out of the top of the shaft furnace, approximately 70 to 90%, preferably 80%, is purified of $CO_2$, $H_2O$ and dust contained in it for example by means of pressure washing. The purified gas is brought to a higher temperature, preferably to approximately 900° C., for example by means of heat exchangers and led back into the zone of reduction of the shaft furnace. The remainder of the flue gas, which is drawn out of the system, is preferably combusted in order to heat the heat exchangers.

In what follows, the invention will be explained more exactly with the aid of examples and with reference to the accompanying drawings in which:

FIG. 1 depicts a schematic view of an apparatus for practicing the method according to the invention in the case of which the reduction gas is produced in the molten iron bath and FIG. 2 depicts a schematic view of an apparatus for performing the method according to the invention wherein the production of the reduction gas is carried out in a separate molten iron bath.

In the embodiment depicted in FIG. 1 the shaft furnace 1 is loaded via a lift gate system 2 with the burden, the latter comprising for the most part iron ore and coke. The coke rate used is dependent upon the amount of gangue contained in the ore and amounts for example for an ore that contains 500 kg gangue or slag per ton of hot metal to approximately 200 kg. The ore may be prepared in the known manner by sintering or pelletization.

The ore is reduced completely in the shaft 3 in the counterflow of the reduction gas 4, which streams through the furnace at a rate of approximately 1500 m³/t of hot metal, and smelted in the zone of fusion 5. Introductory nozzles 7 for oxygen and fuel oil are arranged in the liquid initial bath 6. In order to produce the desired amount of reduction gas approximately 200 kg of oil and 280 Nm³ of oxygen/t of hot metal are necessary. The fuel oil introduced is preheated to a temperature of 300° C. On the one hand, this serves to liquify the combustion material and, on the other hand, helps to improve the power balance, this becoming evident due to the saving of coke. Thus, in the case of the oil being preheated to 300° C. and the fuel oil having a specific heat 0.5 kcal/kg and °C., a heat amount of 30,000 kcal/t of iron is introduced into the zone of fusion of the furnace. Otherwise, 15 kg of coke more would be needed to cover this heat amount and only about 10 kg of oil could be subtracted. 80% (12,000 Nm³/t of hot metal) of the flue gas from the furnace is led away to a pressure washer 8. Before being pressure washed, the flue gas contains approximately 40% $CO_2 + H_2O$, which is removed. At the same time the gas is purified of the dust contained in it. The dedusting of the gas is practically a side-product of the $CO_2$ wash. The only additional work necessary is the purification of the water for washing in the known manner in a clearing tank.

The gas purified in this manner flows through a circulation pump 9, which leads it back to be heated in the heat exchanger 10 and from there to the shaft furnace 1. In the heat exchanger 10 the gas is heated to approximately 900° C. and it is led at this temperature via a second series of introductory nozzles 11 into the zone of reduction of the furnace 1. The whole gas circulation is under a pressure of approximately 4 to 5 bar. Thus, a substantial increase in the reduction efficiency is achieved and furthermore the washing out of carbon dioxide at higher pressure can be carried out more easily and cheaply than at normal pressure. These advantages of the pressure increase are obtained in the case of this method without further having to employ compressors, since only oxygen as a gaseous medium is added to the system from outside, the oxygen being available in a pressurized state as a rule.

The smaller amount—approximately 20%—of the flue gas from the furnace, corresponding to approximately 300 Nm³/t of hot metal, is reduced to normal pressure in a Venturi washer 12 and thus removed from the gas circulation. At the same time this washer serves to regulate the pressure in the whole gas circulation system. The purified flue gas whose pressure is reduced to normal is used after its combustion with air in a combustion chamber to heat the two heat exchangers 10 and 13 which may function according to the principle of the blast-furnace blast heater. It is evident that in the case of the method according to the invention the whole amount of flue gas produced in the furnace is utilized. In the diagram the switching installations 14, 15 for the reciprocal operation of the heat exchangers 10 and 13 are illustrated. The pump 16 pumps combustion air at the rate of 450 Nm³/t of iron into the combustion chamber 17, into which the combustion gas streams at the same time, and is combusted therein. The flue gas coming from the combustion chamber is used to heat the heat exchangers reciprocally.

A second variety of the method according to the invention is illustrated in the diagram in FIG. 2. In this case, the reduction gas is produced in a molten iron bath 20 outside the shaft furnace 1 and blown into the zone of fusion 5 of the shaft furnace via nozzles 21. The introductory nozzles 21 are not immersed into the melt. A short connection tube 22 connects the molten iron bath 20 and the nozzles 21.

Fuel oil 24 and oxygen 25 are introduced into the molten iron bath through the nozzles 23.

The oxygen for the combustion of the coke is introduced into the shaft furnace through the nozzles 26. The rest of the method is the same as in the variety already explained.

We claim:

1. Method of manufacturing hot metal from iron oxide in a shaft furnace by reduction with CO and $H_2$ wherein iron oxide and coke are placed in the shaft furnace, gas containing oxygen is introduced for the combustion of the coke, a reduction gas comprising for the most part CO and $H_2$ and having a temperature ranging from between 1300° to 1500° C. is led from a hot metal zone of fusion into the shaft furnace and the flue gas from the shaft furnace is at least partly purified whereby a backflow gas comprising for the most part CO and $H_2$ is formed and introduced back into the shaft furnace.

2. The method set forth in claim 1 wherein said reduction gas is produced in said hot metal zone of fusion.

3. The method set forth in claim 1 wherein said reduction gas is produced separately from the shaft furnace in a molten iron bath and introduced directly into said hot metal zone of fusion.

4. The method set forth in claims 2 or 3 wherein the reduction gas is formed by the reaction of carbon containing substances with oxygen-containing gases in the iron bath.

5. The method set forth in claim 4 wherein the oxygen-containing gases are introduced below the surface level of the bath through at least one nozzle arranged in the refractory lining, the nozzle being protected against premature burning back by means of hydrocarbon-containing media, and the carbon containing substances are introduced below the level of said bath through at least one nozzle arranged in said refractory lining.

6. The method set forth in claim 1 wherein the flue gas of the shaft furnace is completely or partially purified of $CO_2$, $H_2O$ and a large portion of dust, is heated to a temperature ranging from 800° to 1000° C. and is introduced back into the shaft furnace above said hot metal zone of fusion.

7. The method set forth in claim 1 wherein the shaft furnace is operated at an excess pressure ranging from between 0.5 and 8 bar, in particular 2 to 4 bar.

8. The method set forth in claim 1 wherein fuel oil or residue oils from the distillation of crude oil, which are preheated to a temperature ranging from 150° to 400° C., are employed for the production of the reduction gas.

9. The method set forth in claim 4 wherein coal dust is employed for the production of the reduction gas.

10. The method set forth in claim 1 wherein the amount of coke used is controlled such that its combustion to CO for the most part provides the fusion heat required for the iron and the slag.

11. The method set forth in claim 1 wherein half the amount of reduction gas required is provided by the backflow gas gained from the flue gas of the shaft furnace.

12. The method set forth in claim 1 wherein the zone of reduction of the shaft furnace is operated at a temperature of approximately 900° C.

13. The method set forth in claims 2 or 3 wherein the reduction gas is formed by the reaction of hydrocarbon-containing substances with oxygen-containing gases in the iron bath.

14. The method set forth in claim 13 wherein the oxygen-containing gases are introduced below the surface level of the bath through at least one nozzle arranged in the refractory lining, the nozzle being protected against premature burning back by means of hydrocarbon-containing media, and the hydrocarbon-containing substances are introduced below the level of said bath through at least one nozzle arranged in said refractory lining.

* * * * *